(12) United States Patent
Iwasa et al.

(10) Patent No.: US 10,176,920 B2
(45) Date of Patent: Jan. 8, 2019

(54) BUILDING AND CONSTRUCTION METHOD FOR THE SAME

(75) Inventors: Koichiro Iwasa, Tokyo (JP); Kenzo Matsumoto, Moriya (JP); Masataka Kawakubo, Tokyo (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 699 days.

(21) Appl. No.: 14/005,703

(22) PCT Filed: Mar. 30, 2012

(86) PCT No.: PCT/JP2012/058571
§ 371 (c)(1),
(2), (4) Date: Sep. 17, 2013

(87) PCT Pub. No.: WO2012/133762
PCT Pub. Date: Oct. 4, 2012

(65) Prior Publication Data
US 2014/0008996 A1   Jan. 9, 2014

(30) Foreign Application Priority Data

Mar. 31, 2011   (JP) ................................. 2011-078081
Mar. 31, 2011   (JP) ................................. 2011-078082

(51) Int. Cl.
*H01F 38/14*   (2006.01)
*H02J 50/12*   (2016.01)
(Continued)

(52) U.S. Cl.
CPC .............. *H01F 38/14* (2013.01); *E04B 5/43* (2013.01); *H02J 5/005* (2013.01); *H02J 50/12* (2016.02);
(Continued)

(58) Field of Classification Search
CPC ........ E04B 1/34869; E04B 5/43; H01F 38/14; H01F 27/006; H01F 27/02;
(Continued)

(56) References Cited

U.S. PATENT DOCUMENTS

2001/0015280 A1* 8/2001 Karst ..................... H02G 3/288
174/502
2005/0134213 A1* 6/2005 Takagi .................. H02J 7/0054
320/108
(Continued)

FOREIGN PATENT DOCUMENTS

CN   101964535   2/2011
JP   2009-159675   7/2009
(Continued)

OTHER PUBLICATIONS

International Search Report dated Jun. 26, 2012 in International (PCT) Application No. PCT/JP2012/058571.
(Continued)

*Primary Examiner* — Rexford Barnie
*Assistant Examiner* — Thai Tran
(74) *Attorney, Agent, or Firm* — Wenderoth, Lind & Ponack, L.L.P.

(57) ABSTRACT

This building includes a power supply coil of a contactless power supply system using magnetic resonance type. Then, a construction method for this building includes steps of: linking a plurality of building members to each other respectively provided with split wires into which a power supply coil forming a loop as a whole is split at a plurality of locations along an extending direction of the power supply coil, so as to surround an indoor space; and forming the power supply coil surrounding the indoor space by electrically connecting the respective split wires to each other.

9 Claims, 10 Drawing Sheets

(51) Int. Cl.
   *H02J 50/50* (2016.01)
   *E04B 5/43* (2006.01)
   *H02J 5/00* (2016.01)
   *E04B 1/348* (2006.01)
(52) U.S. Cl.
   CPC ........... *H02J 50/50* (2016.02); *E04B 1/34815* (2013.01); *E04B 1/34869* (2013.01)
(58) Field of Classification Search
   CPC ......... H01F 2038/143–2038/146; H02J 5/005; H02J 7/025; H02J 17/00; H02G 3/288; H02G 3/121; H02G 3/123; H02G 3/36; H02N 2/008; H04B 5/0025–5/0093; B60L 5/005; B60L 11/182; B60L 11/1829–11/1831; Y02T 90/122; H01R 13/6633; A61B 1/00029; A61N 1/3787
   USPC .......................................... 307/104; 320/108
   See application file for complete search history.

(56) References Cited

U.S. PATENT DOCUMENTS

| | | | | |
|---|---|---|---|---|
| 2007/0182367 A1* | 8/2007 | Partovi | ................... | H01F 5/003 320/108 |
| 2009/0134712 A1* | 5/2009 | Cook | ...................... | H02J 5/005 307/104 |
| 2010/0219183 A1* | 9/2010 | Azancot | .................. | H02J 5/005 219/676 |
| 2010/0244584 A1* | 9/2010 | Azancot | .................. | H02J 5/005 307/104 |
| 2010/0259401 A1* | 10/2010 | Azancot | .................. | H02J 5/005 340/657 |
| 2010/0289341 A1* | 11/2010 | Ozaki | .................. | H04B 5/0037 307/104 |

FOREIGN PATENT DOCUMENTS

| | | |
|---|---|---|
| JP | 4366699 | 11/2009 |
| JP | 2010-239847 | 10/2010 |
| JP | 2010-239848 | 10/2010 |
| JP | 2011-501633 | 1/2011 |
| JP | 2011-30317 | 2/2011 |
| JP | 2011-151900 | 8/2011 |
| JP | 2011-151901 | 8/2011 |
| JP | 2012-16250 | 1/2012 |
| WO | 2009/047768 | 4/2009 |
| WO | 2009/111597 | 9/2009 |

OTHER PUBLICATIONS

Office Action dated Feb. 2, 2015 in Chinese Application No. 201280015454.5, with partial English translation.

* cited by examiner

BUILDING AND CONSTRUCTION METHOD FOR THE SAME

CROSS-REFERENCE TO RELATED APPLICATION

This is the U.S. National Phase Application under 35 U.S.C. § 371 of International Patent Application No. PCT/JP2012/058571 filed Mar. 30, 2012, which designated the United States and was published in a language other than English, which claims the benefit of Japanese Patent Application No. 2011-078081, filed Mar. 31, 2011 and Japanese Patent Application No. 2011-078082, filed Mar. 31, 2011, all of them are incorporated by reference herein. The International Application was published in Japanese on Oct. 4, 2012 as WO2012/133762 A1 under PCT Article 21(2).

TECHNICAL FIELD

The present invention relates to a building provided with a contactless power supply system, and a construction method of the building.

BACKGROUND ART

In conventional buildings such as houses, stores, and offices, an opening is formed on the wall, ceiling and floor surface to install a connector such as a plug socket at the opening and ensure a power supply port. Then, a plug of the electric wire of an electrical appliance (electrical load) is connected to the connector to supply an electrical power to electrical equipment. In addition, in order to simultaneously supply electrical power to more electrical appliances, due to the increased use of electrical products in recent years, connectors such as plug sockets are arranged to correspond to the increasing demand for a power source in such a manner that the connector is connected via a power strip or disposed not only on the wall surface of the building but also on the furniture.

Such a contact type power supply system needs to form the opening on building members to install the connector such as the plug socket. Thus, depending on the installation position, there are restrictions on the indoor layout, thereby degrading flexibility of indoor design. In addition, depending on the installation position of the connector, arrangement of the electrical appliances such as household appliances is also restricted.

In contrast, Patent Document 1 discloses a contactless power supply panel including a plurality of contactless power supply units installed at a plurality of positions in a housing to generate a high frequency magnetic field, a contactless power receiving unit that supplies the electrical load with the electrical power received in a contactless manner from the respective contactless power supply units by using electromagnetic induction resulting from the high frequency magnetic field generated by the contactless power supply units, and attachment means for attaching the contactless power receiving unit to the outer surface of the housing which opposes the respective contactless power supply units.

The contactless power supply panel, being installed in the building, can supply the electrical load with the electrical power without providing the contact type connector such as the plug socket. Accordingly, it is not necessary to provide the building members with the opening for installing the connector. Therefore, it is possible to prevent airtightness from being deteriorated due to the formed opening of the building members, and simplified construction work can be achieved.

PRIOR ART DOCUMENTS

Patent Documents

[Patent Document 1] Japanese Unexamined Patent Application, First Publication No. 2009-159675

DISCLOSURE OF INVENTION

Incidentally, in the above-described contactless power supply panel using electromagnetic induction, it is necessary to accurately align the contactless power supply unit and the contactless power receiving unit so as to oppose each other, and it is difficult to increase a power supply distance. Therefore, there has been a problem in that a lot of restrictions are imposed when in use, and the restriction on the indoor layout, regulation on the flexibility in the indoor design, and the restriction on the arrangement of the electrical load cannot be alleviated. In addition, it is necessary to accurately align the contactless power supply unit and the contactless power receiving unit so as to be opposite each other when supplying the electrical power. Accordingly, it cannot correspond to the increased number of uses of electrical products.

The present invention aims to solve problems of the contactless power supply panel using the above-described contactless power supply system and the electromagnetic induction method, and an object thereof is to provide a building including a power supply coil of a contactless power supply system, and a construction method for the building, which can alleviate the restrictions on indoor layouts, the regulations on the flexibility of indoor design, and the restriction on the arrangement of the electrical load.

In order to solve the above-described problems, the invention provides the following.

(1) A building according to an aspect of the present invention includes a power supply coil of a contactless power supply system using magnetic field resonance.

(2) In the building according to the above-described (1), the power supply coil may be arranged between a building member located on the innermost layer facing an indoor space and another building member located on the outermost layer facing outdoors.

(3) The building according to the above-described (1) or (2) may further include a repeater that is configured to resonate at the same frequency as that of the power supply coil.

(4) The building according to any one of the above-described (1) to (3) may be configured to further include a plurality of building members which are continuously provided so as to surround an indoor space. The power supply coil may be provided in the respective building members so as to form a loop surrounding the indoor space along the respective building members in the arrangement direction.

(5) In a case of the building according to the above-described (4), the power supply coil may include split wires that are split for each of the building members, and a connector that electrically connects the split wires to each other.

(6) In the building according to the above-described (4) or (5), the building member may be at least one of a wall material, a skirting board, a flooring material and a ceiling material.

(7) The building according to any one of the above-described (1) to (6) may be configured to further include a building member having an indoor surface facing an indoor space. The power supply coil may include a plurality of small coils, and the small coils may be arrayed so as to divide the indoor surface into a plurality of regions.

(8) In the building according to the above-described (7), the building member may be configured to be a flooring material including joists arranged in a lattice pattern and a heat insulating material arranged between the joists, and the small coils may be integrally provided in at least any one of the heat insulating material and the joists.

(9) In the building according to the above-described (7) or (8), the size of the small coils may vary for each of the regions.

(10) A construction method for a building according to a second aspect of the present invention includes a step of linking a plurality of building members to each other respectively provided with split wires into which a power supply coil is split at a plurality of locations along a wire rod of the power supply coil, so as to surround an indoor space; and a step of forming the power supply coil surrounding the indoor space by electrically connecting the respective split wires to each other.

The building according to the above-described (1) adopts a contactless power supply system using magnetic field resonance, the contactless power supply system having a power supply distance longer than that of an electromagnetic induction system and being capable of supplying higher electrical power than the radio wave system, instead of the electromagnetic induction system in which it is difficult to increase the power supply distance while high electrical power is supplied, or instead of a radio wave system in which it is difficult to increase suppliable electrical power while the power supply distance is increased.

Then, if a power supply coil of such a contactless power supply system using magnetic field resonance is provided, it is possible to perform contactless power supply to electrical loads such as the household appliances at any position of the indoor space of the building. In addition, it is possible to achieve a cordless system by eliminating the need to install the connector such as the plug socket, and it is possible to enhance the interior design. Furthermore, it is not necessary to form the opening for wiring in building members such as wall materials, ceiling materials and flooring materials, thereby enabling the workability and designability to be improved. Furthermore, since the opening is no longer required to be formed on the building members, it is also possible to prevent deterioration due to the formation of the opening, in the airtightness of the building members or the building.

In addition, the flexibility in arrangement of the electrical loads such as the household appliances is enhanced, and thus the indoor design can be easily changed. Then, without the layout being restricted, when designing the building, it is not necessary to determine the layout from the viewpoint of the power supply. In particular, it is possible to easily change the layout and the indoor design after the building is completed.

In addition, it is not necessary to carry out electric wiring work after the building is completed, and thus the construction cost for the electric wiring work can be saved. In particular, it is possible to reduce the economic burden in a case of changing the layout after the building completed. Accordingly, the indoor can be arranged to follow the current design trend, and thus it is possible to easily respond to a change in the design of the building which evolves with the lapse of time.

In a case of the building according to the above-described (2), the power supply coil is arranged between an inner wall and an outer wall, or in a range from a building member located on the innermost layer forming an indoor space to another building member located on the outermost layer facing the outdoor on the roof or outer wall surface. According to this configuration, the power supply coil is not obviously present in the indoor space, and thus it is possible to prevent the indoor design of the building from being impaired by the power supply coil.

In a case of the building according to the above-described (3), it is possible to increase the power supply distance while maintaining the power supply efficiency by providing a repeater (relay) that resonates at the same frequency as that of the power supply coil. This can further reliably remove the restriction on the indoor layout, the restriction on the flexibility in the indoor design and the arrangement of the electrical loads such as the household appliances.

In a case of the building according to the above-described (4), the power supply coil is arranged so as to surround the indoor space by being provided in a series of building members (for example, a wall, skirting board and beam) arranged so as to surround the indoor space. Accordingly, it is possible to perform contactless power supply to the electrical loads such as the household appliances at any position in the indoor space of the building. In addition, it is possible to achieve a cordless system by eliminating a need to install a connector such as the plug socket, and it is possible to enhance the interior design. Furthermore, it is not necessary to form the opening for wiring on the building members of the wall, ceiling and floor, thereby enabling the workability and indoor designability to be improved. Furthermore, it is not necessary to form the opening in order to install the connector. Accordingly, it is also possible to prevent deterioration due to the formation of the opening, in the airtightness of the building members or the building.

In addition, since it is possible to perform the contactless power supply to the electrical loads such as the household appliances at any position in the indoor space of the building, the flexibility is enhanced in arranging the electrical loads such as the household appliances, and thus the design can be easily changed. Then, without the layout being restricted, the layout is smoothly built without any restriction from the viewpoint of power supply when designing the building. In particular, it is possible to easily change the layout and the indoor design after the building is completed.

In addition, it is not necessary to carry out electric wiring work after the building is completed, and thus the construction cost for the electric wiring work can be saved. In particular, it is possible to reduce the economic burden in the case of changing the layout later. Accordingly, the indoor can be arranged to follow the current design trend, and thus it is possible to easily respond to a change in the design of the building such as the house, which evolves with the lapse of time.

In a case of the building according to the above-described (5), the respective building members formed to be divided in a direction surrounding the indoor space, such as the wall and skirting board, for example, are provided with the split wires of the power supply coil. Then, it is possible to connect the mutually adjacent building members to each other, and to electrically connect the mutually adjacent split wires to each other using the connector. As a result, the power supply coil having a loop shape can be formed so as to surround the indoor space by connecting the split wires.

According to this configuration, it is possible to more reliably and easily arrange the power supply coil so as to surround the indoor space.

In a case of the building according to the above-described (6), even if the building member is any one of a wall material, a skirting board, a flooring material and a ceiling material, it is possible to more reliably and easily arrange the power supply coil so as to surround the indoor space.

In a case of the building according to the above-described (7), instead of covering a wide area by using a single power supply coil, it is possible to suppress the magnetic field intensity and to uniformize the distribution of the magnetic field intensity along an indoor surface. In addition, it is possible to minutely set the distribution of the magnetic field intensity required for the indoor space by minutely setting the arrangement, size and number of the small coils for each area on the indoor surface. Furthermore, even if the indoor design is to be changed after the building is completed, it is possible to easily respond to the change.

In a case of the building according to the above-described (8), the small coils can be simultaneously installed simply by replacing the joists or the heat insulating material. Accordingly, when changing the indoor design due to the reconstruction work, it is possible to carry out construction work easily and at low cost. In addition, it is possible to obtain a similar advantageous effect in not only the reconstruction work but also in the new construction work.

In a case of the building according to the above-described (9), when changing the indoor design due to the reconstruction work, according to the indoor layout after the reconstruction, it is possible to freely adjust the strength and weakness for each region, in the magnetic field intensity and the range which the magnetic field affects.

In the construction method for the building according to the above-described (10), the split wires of the power supply coil are provided in the respective building members formed to be divided in the direction surrounding the indoor space, such as, for example, the wall and skirting board. Then, the mutually adjacent building members are connected to each other, and the mutually adjacent split wires are electrically connected to each other. As a result, the power supply coil having a loop shape can be formed so as to surround the indoor space by connecting the split wires. According to this construction method, it is possible to more reliably and easily arrange the power supply coil so as to surround the indoor space. As a result, it is possible to obtain the same operation effect as that of the building according to the above-described (1).

DETAILED DESCRIPTION OF THE INVENTION

First Embodiment

Hereinafter, a building according to a first embodiment of the present invention will be described with reference to FIGS. 1 to 5.

Figure 1:
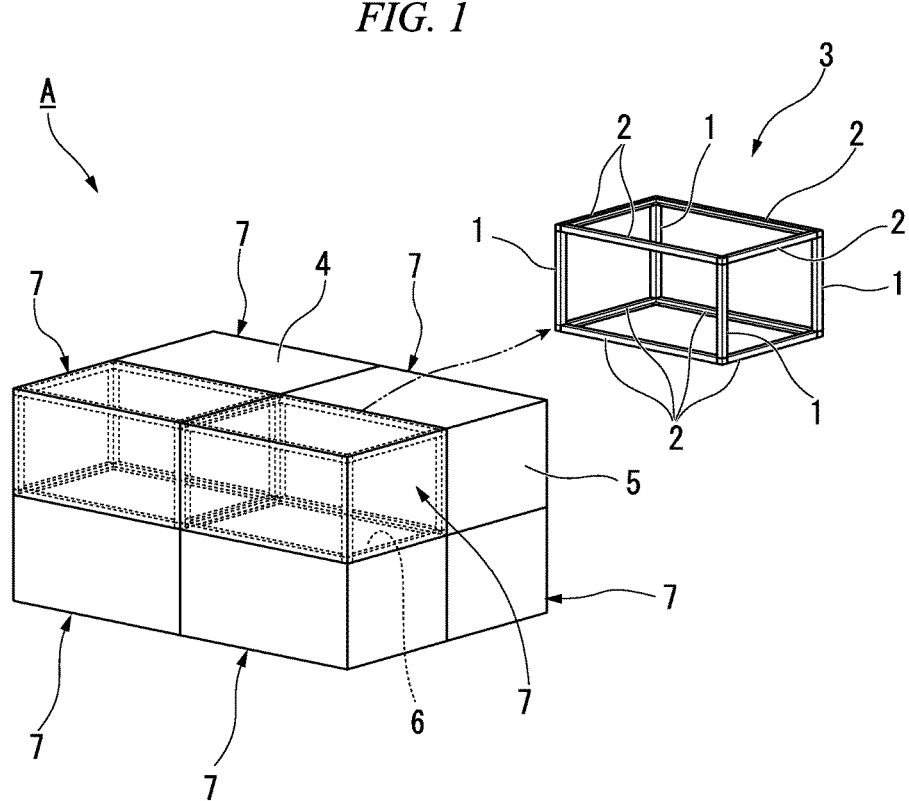
FIG. 1 is a perspective view illustrating a building according to a first embodiment of the present invention.

The building of the present embodiment is a house, store, or office, and for example, is constructed using a unit construction method. As illustrated in FIG. 1, the building is formed by connecting multiple steel columns 1 and multiple steel beams 2 (building members) at a factory. For example, a ceiling panel 4, wall panels 5 and a floor panel 6 (hitherto, building members) are installed in a frame structure body 3 having a rigid-frame structure to construct a building unit 7 having a rectangular parallelepiped shape. Then, multiple building units 7 are transported to a construction job site, and are installed side by side on a base structure. Furthermore, the building unit 7 forming an upper stage is laid up on the building unit 7 forming a lower stage. Furthermore, a building A is constructed by integrating the multiple building units 7 with each other.

In a case where the building A is constructed using such a unit construction method, the construction efficiency of the building A can be enhanced and in addition, a high structural strength can be ensured.

On the other hand, the building A of the present embodiment includes a contactless power supply system for supplying the electrical power to electrical appliances such as household appliances (electrical loads) in a contactless manner. The contactless power supply system is a power supply system using magnetic field resonance, and includes a power supply coil (power supply side device and magnetic field generator) and a power receiving coil (power receiving side device).

Figure 2:
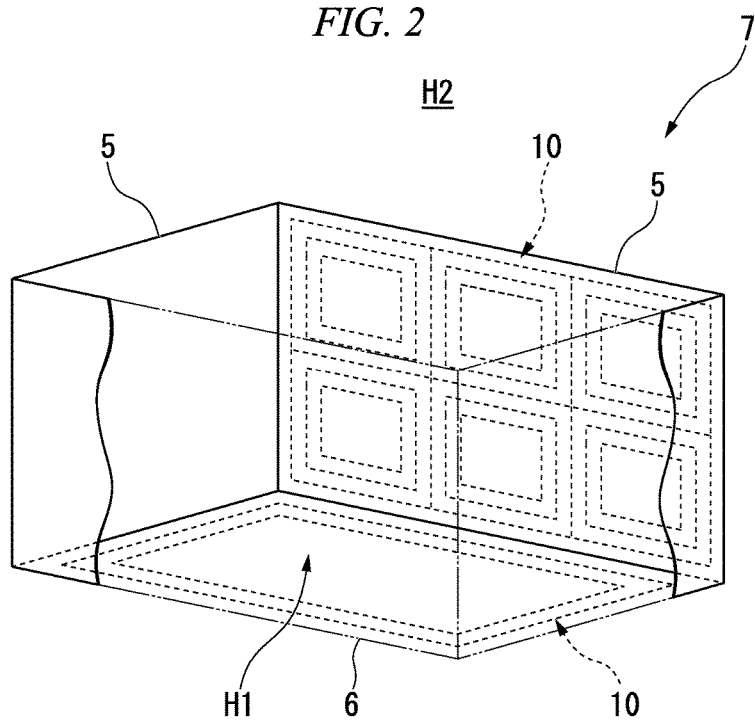
FIG. 2 is a view illustrating a building unit of the building according to the first embodiment, and is a perspective view illustrating arrangement of a power supply coil of a contactless power supply system.
Figure 3:
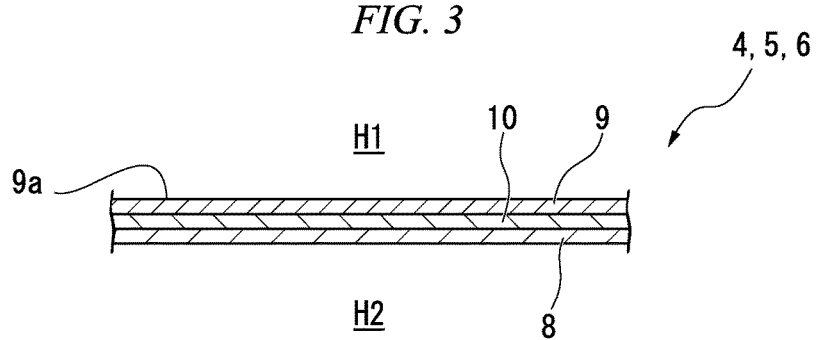
FIG. 3 is a cross-sectional view illustrating a wall portion of the building unit.

In the present embodiment, for example, as illustrated in FIGS. 2 and 3, a power supply coil 10 having a sheet shape or a plate shape is interposed between a base 8 and a decorative laminate 9 to form the ceiling panel 4, the wall panels 5 and the floor panel 6, and these building members are installed to construct the respective building units 7. In this manner, in the present embodiment, the power supply coil 10 is provided at an outdoor H2 side rather than an inner surface 9a of the building members 4, 5 and 6 which dividedly form an indoor space H1. In addition, after constructing a building A by installing the multiple building units 7, a power supply line connected to a power source (both of them not illustrated) is connected to the power supply coil 10 provided in the ceiling panel 4, the wall panels 5 and the floor panel 6, thereby enabling the power supply from the power source to each power supply coil 10.

The power receiving coil has the same resonance frequency as the power supply coil 10. After being attached to the electrical appliances such as the household appliances (electrical loads), the power receiving coil is directly and electrically connected to the electrical appliances or connected via a power supply cable so as to be appropriately arranged in an indoor space H1 or an outdoor space H2 of the building A. The term "the same resonance frequency" is not limited to completely the same, but mean substantially the same.

In the building A provided with the power supply coil 10 configured as described above, if the current having the same frequency as the resonance frequency flows from the power source to the power supply coil 10, the magnetic field vibrates between the power supply coil 10 and the power receiving coil, and a resonance phenomenon occurs between the power supply coil 10 and the power receiving coil. Then, if the resonance phenomenon is caused to occur in this way, the electrical power is supplied from the power supply coil 10 to the power receiving coil, consequently to the electrical appliances via the magnetic field generated between the power supply coil 10 and the power receiving coil.

The building A of the present embodiment includes the power supply coil 10 of the contactless power supply system using magnetic field resonance, the contact power supply system having the power supply distance longer than that of an electromagnetic induction system and being capable of supplying higher electrical power than the radio wave system, instead of the electromagnetic induction system in which it is difficult to increase the power supply distance while high electrical power is supplied, or instead of the radio wave system in which it is difficult to increase the suppliable electrical power while the power supply distance is increased.

Since the power supply coil 10 of the contactless power supply system using magnetic field resonance is provided, it is possible to perform contactless power supply to electrical appliances such as the household appliances (electrical loads) at any position in the indoor space H1 of the building A. In addition, it is possible to achieve a cordless system by eliminating a need to install the connector such as the plug socket, and it is possible to enhance the interior design. Furthermore, it is not necessary to form the opening for wiring on the building members 4, 5 and 6 of the wall, ceiling and floor, thereby enabling the workability and indoor designability to be improved. Accordingly, it is also possible to prevent deterioration due to the formation of the opening, in the airtightness of the building members or the building.

In addition, there is no longer a restriction on the power supply position due to the fixed installing location of a connector such as a plug socket. Therefore, the flexibility in arrangement of the electrical appliances such as the household appliances is enhanced, and thus the design can be easily changed. Then, without the layout being restricted, the layout is smoothly settled without any restriction from the viewpoint of the power supply when designing the building. In particular, after completing the building A, it is possible to easily change the layout and design of the indoor space H1 later.

In addition, since the electric wiring work when constructing or after completing the building A is substantially no longer necessary, the construction cost for the electric wiring work can be saved. In particular, it is possible to reduce the economical burdens when the layout later is changed. Accordingly, the indoor design can be arranged to follow the current indoor design trends, and thus it is possible to easily respond to a change in the design of a building A, such as the house, which evolves with the lapse of time.

Figure 4:
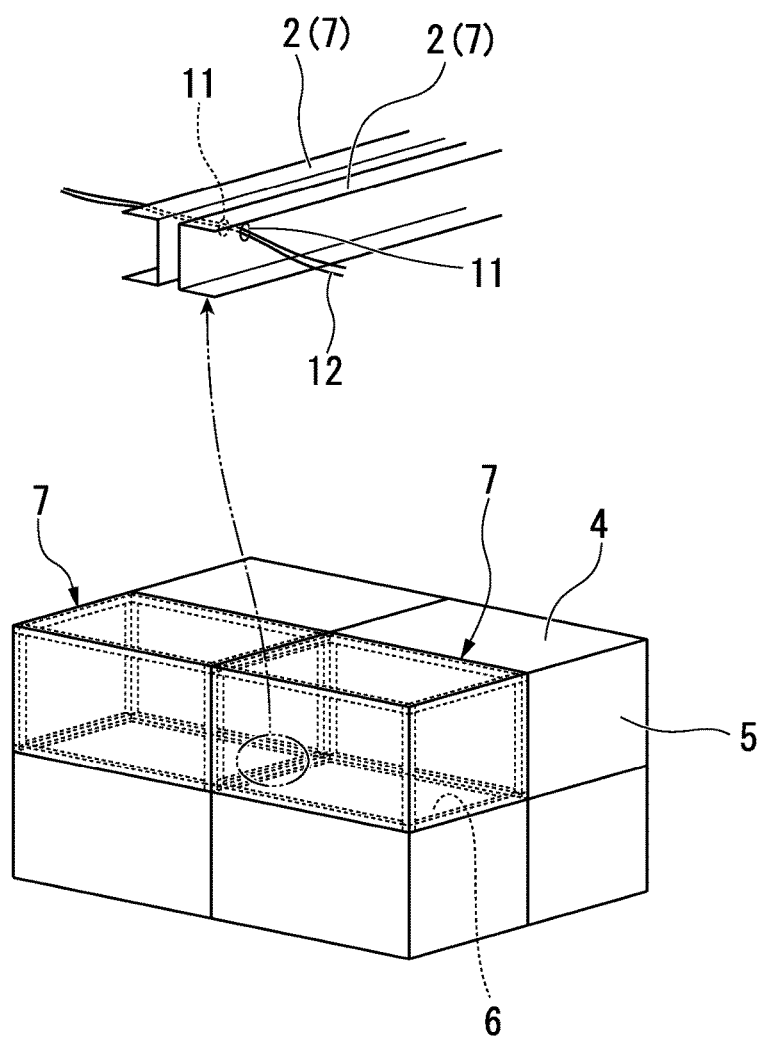
FIG. 4 is a perspective view illustrating a wiring method in a conventional building.

The building A of the present embodiment is constructed using the unit construction method. In addition, in the frame structure body 3 of the building unit 7, a C-beam is used for the steel beam 2 used as the ceiling beam or floor beam and in addition, a square steel pipe is used for the steel column 1. Then, in the conventional art, in a case where the building A is constructed using such a unit construction method, as illustrated in FIG. 4, wire passing holes 11 are drilled in advance on the respective mutually adjacent steel beams 2 (ceiling beam), and a wire 12 is allowed to pass through each of the wire passing holes 11 to perform wiring between the mutually adjacent building units 7. In the conventional art, the wire 12 connected to switches and the like at the factory is connected at the construction job site. However, in order to avoid shortage of the length of the wiring in the construction job site, the wire 12 is left long. In this case, in a state where the wire 12 kept long is wound spirally and placed on the ceiling 4, the respective building unit 7 is transported from the factory to the construction job site.

Figure 5:
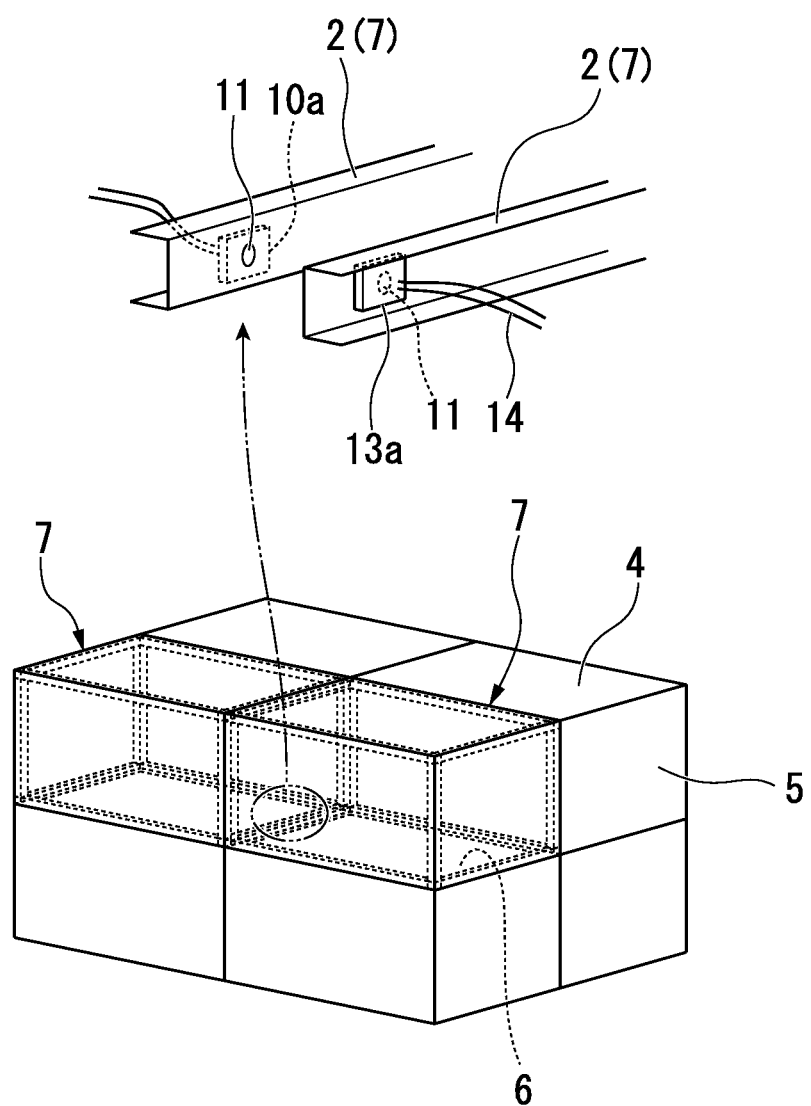
FIG. 5 is a perspective view illustrating a wiring method in the building according to the first embodiment.

On the other hand, as illustrated in FIG. 5, in addition to the power supply coil 10 for indoor power supply, the above-described power supply system using magnetic field resonance may be adopted to the connection of the wire between the mutually adjacent building units 7. That is, a small power supply coil 10a may be attached to one steel beam 2 (ceiling beam or floor beam) of the mutually adjacent building units 7, and a power receiving coil 13a may be attached to the other steel beam 2 (ceiling beam or floor beam) of the building unit 7. In this case, when installing the respective building units 7 at a predetermined position, it is preferable to install the power supply coil 10a and the power receiving coil 13a so as to oppose each other. Furthermore, in a case where the wire passing holes 11 are formed on the respective steel beams 2 (ceiling beam or floor beam), it is preferable to provide the power supply coil 10a and the power receiving coil 13a so as to cover the wire passing holes 11.

In a case where the power supply coil 10a and the power receiving coil 13a are provided in this way, if the current having the same frequency as the resonance frequency flows from the power source to the power supply coil 10a, the magnetic field is generated by the resonance phenomenon between the power supply coil 10a and the power receiving coil 13a. As a result, the electrical power is supplied from the power supply coil 10a to the power receiving coil 13a. Then, if the electrical appliances are connected to a wire 14 connected to the power receiving coil 13a, it is possible to perform power supply between the adjacent building units 7 without performing wiring between the adjacent building units 7 by causing the wire 12 to pass through the wire passing holes 11 as in the conventional art.

Accordingly, wiring work between the building units 7, which has been performed at the construction job site, is no longer required, and thus it is possible to reduce the man-hour at the construction job site. In addition, since it is not necessary to carry out the connection work of the wire 12 to the switches and the like at the construction job site, it is possible to reduce the man-hour at the construction job site even from this viewpoint. Furthermore, since it is not necessary to leave the wire 12 long, it is possible to reduce the electrical resistance when turning on the electricity, and the construction cost can be reduced by reducing the amount of wire used.

Furthermore, following that IT (IT: Information Technology) introduced houses and all-electric houses (all-electric indoor appliances) are widely spread, there is a tendency that the wiring amount is increased. Then, if the size of the wire passing holes 11 to be formed on the steel beam 2 (ceiling beam or the like) of the building unit 7 is increased according to an increase in the wiring amount, or the number of the wire passing holes 11 is increased, in some cases, the strength of the steel beam 2 is degraded. In contrast, if the power supply coil 10*a* and the power receiving coil 13*a* are provided as described above to perform the power supply between the adjacent building units 7, the wire passing holes 11 are not required. Accordingly, it is possible to flexibly and reliably respond to the IT introduced houses and all-electric houses.

In addition, recently, the IT introduced houses and all-electric houses result in the increase in the number of electrical appliances (electrical loads) to be used. Then, in a case where a contact type connector such as the plug socket in the conventional art is provided, or in a case of the contactless power supply system of the electromagnetic induction system, since the number of units is determined, the restriction occurs in the number of the connectable electrical appliances. Even if the number of the units is increased by connecting a power strip to the connector (plugging too many power cords into a power strip), the restriction occurs in the number of the connectable electrical appliances. In contrast, in a case such as described in the present embodiment, the power supply coils 10 and 10*a* of the contactless power supply system using magnetic field resonance are provided to perform the contactless power supply to the electrical appliances in the indoor space H1 of the building A, the restriction does not occur in the number of the electrical appliances for the power supply. Accordingly, even if the number of the electrical appliances to be used is increased due to the spread of IT introduced houses and all-electric houses, it is possible to reliably respond to the electrical appliances.

Hitherto, the building A according to the first embodiment of the present invention has been described. However, the present invention is not limited to only the configuration of the above-described embodiment and can be appropriately modified without departing from the scope thereof. For example, in the present embodiment, a case where the building A is constructed by using the unit construction method has been described, but the building may be constructed using an alternative construction method such as a general wooden structure construction method in the conventional art. Even in this case, it is possible to obtain the same advantageous operation effect as that of the present embodiment by providing the building member with the power supply coil 10 and the power supply coil 10*a*.

In addition, the power supply coil 10 may be provided within a range between the inner wall facing the indoor space H1 and the outer wall or the upper portion of the roof, that is, from the building member (for example, the decorative laminate 9) located on the innermost layer forming the indoor space H1 to the building member located at the outermost layer facing the outdoor H2. In this case, without having the power supply coil 10 exposed to the indoor space H1, it is possible to prevent the indoor design of the indoor space H1 of the building A from being damaged by the power supply coil 10. In addition, for example, the power supply coil 10 may be formed by printing the wire on the interior decorating cloth, and the power supply coil 10 together with the cloth may be attached to the building member located at the outermost surface (outermost surface side) forming the indoor space H1. In this manner, printing the wire on the cloth enables the power supply coil 10 to easily be provided in the building member. Then, it is possible to form the power supply coil 10 in the building A by attaching the cloth to the wall panels 5 and the ceiling panel 4 so as to surround the indoor space H1.

In addition, a plurality of the power supply coils 10 may be arranged inside the indoor space H1 by appropriately combining the wall panels 5, the steel beam 2 and the other building members, all of which are provided with the wire in advance.

Furthermore, a repeater (relay) that resonates at the same frequency as that of the power supply coils 10 and 10*a* may be provided between the power supply coils 10 and 10*a* and the power receiving coil 13. In this case, it is possible to increase the power supply distance while maintaining the power supply efficiency. That is, it is possible to maintain the power supply efficiency even if the distance is increased between the power supply coils 10 and 10*a* and the power receiving coil 13. Accordingly, the restriction on the distance between the power supply coil 10 and the power receiving coil 13 is decreased. Therefore, it is possible to further enhance the flexibility in arrangement of the electrical loads such as the household appliances.

Second Embodiment

Hereinafter, a building and a construction method thereof according to a second embodiment of the present invention will be described with reference to FIGS. 6 to 9.

Figure 6:
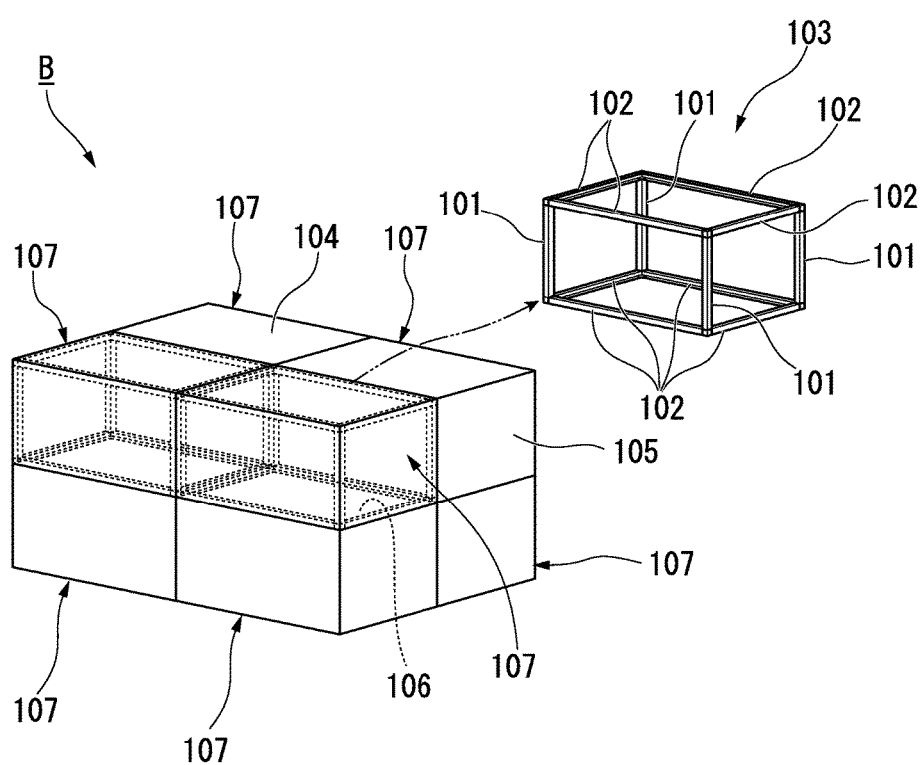
FIG. 6 is a perspective view illustrating a building according to a second embodiment of the present invention.

Similarly to the above-described first embodiment, the building of the present embodiment is a house, store, or office, and for example, is constructed using a unit construction method. As illustrated in FIG. 6, the building is formed by connecting multiple steel columns 101 and multiple steel beams 102 (building members) at a factory. For example, a ceiling panel 104, wall panels 105 and a floor panel 106 (building members) are installed in a frame structure body 103 having a rigid-frame structure to construct a building unit 107 having a rectangular parallelepiped shape. Then, multiple building units 107 are transported to a construction job site, and are installed side by side on a base structure. Furthermore, the building unit 107 forming an upper stage is laid up on the building unit 107 forming a lower stage. Furthermore, a building B is constructed by integrating the multiple building units 107 with each other.

In a case where the building B is constructed using such a unit construction method, the construction efficiency of the building B can be enhanced and in addition, the high structural strength can be ensured.

On the other hand, similarly to the above-described first embodiment, the building B of the present embodiment includes a contactless power supply system for supplying the electrical power to electrical appliances such as household appliances (electrical loads) in a contactless manner. The contactless power supply system is a power supply system using magnetic field resonance, and includes a power supply coil (power supply side device and magnetic field generator) and a power receiving coil (power receiving side device).

The building B of the present embodiment is assembled by installing a ceiling panel 104, wall panels 105 and a floor panel 106 with respect to the frame structure body 103. Then, a power supply coil is provided in a series of building materials surrounding an inner space H3 of the building B. Moreover, the power supply coil of the present embodiment includes split wires split for each of the building members and a connector electrically connecting these split wires to each other.

Figure 7:
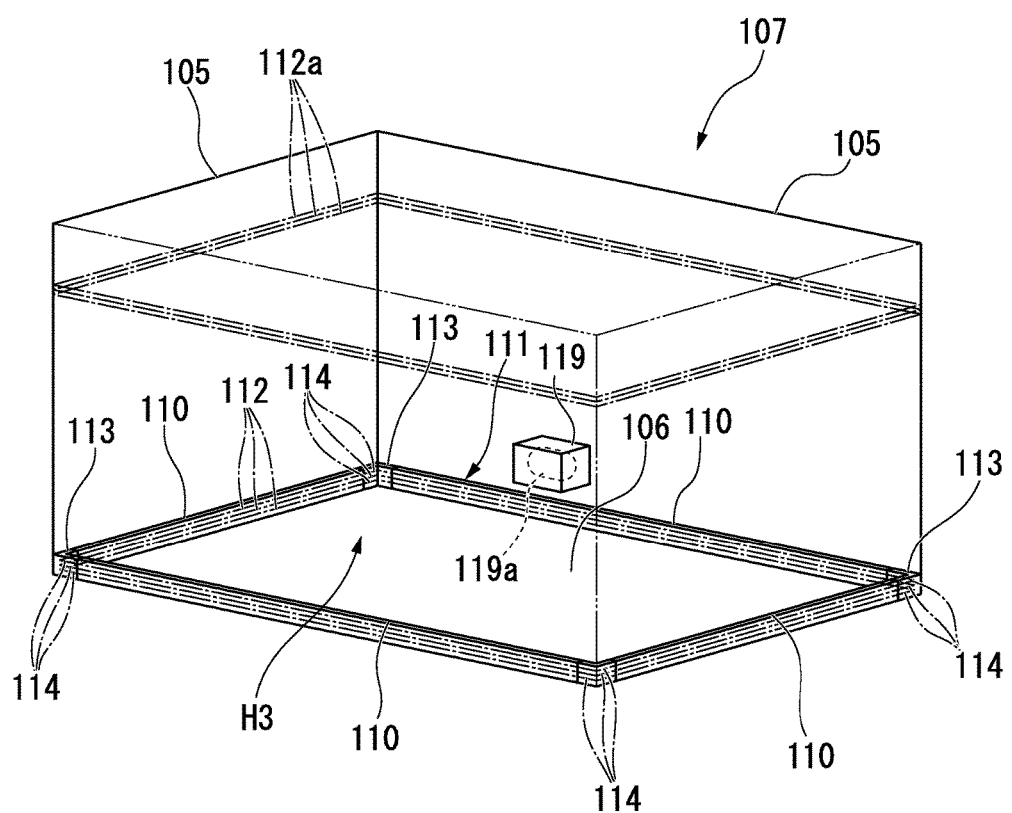
FIG. 7 is a perspective view illustrating a building unit of the building according to a second embodiment.
Figure 8:
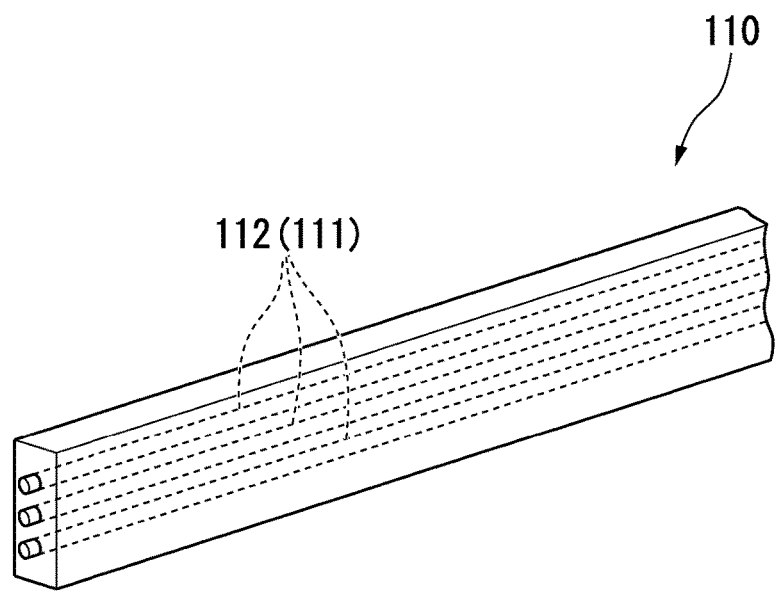
FIG. 8 is a view illustrating a building member of the building unit, and is a perspective view of an end portion of a skirting board provided with wires of a power supply coil of a contactless power supply system.

To be more specific, in the present embodiment, as illustrated in FIGS. 7 and 8, a skirting board 110 which is a molding attached along the lower end edge of the respective wall panels 105 is selected as a series of the building members, and the skirting board 110 has built-in wires 112 forming a power supply coil 111. The skirting board 110 is divided into four so as to surround the indoor space H3 when seen in a plan view. The respectively divided skirting boards 110 (skirting board piece) are attached to the respective wall panels 105 to be arranged so as to surround the indoor space H3. Furthermore, the multiple wires 112 (split wires) embedded in the respective skirting boards 110 and forming the power supply coil 111 are arranged along the skirting board 110 in the longitudinal direction (extending direction). That is, the building B of the present embodiment is provided with four skirting boards 110 which are a plurality of building members continuously provided so as to surround the indoor space, and the wires 112 forming the power supply coil 111 are provided in the respective skirting boards 110 so as to form a loop surrounding the indoor space H3 along the array direction of four skirting boards 110.

In addition, in a state where the respective skirting boards 110 are arranged so as to surround the indoor space H3, end portions of the mutually adjacent skirting boards 110 are connected to each other using the connectors 113. The respective connectors 113 have embedded conductive members 114 such as an L-shaped lead wire for electrically connecting the wire 112 embedded in one adjacent skirting board 110 and the wire 112 embedded in the other skirting board 110. That is, the respective connectors 113 serve as a role of mechanically connecting the respective skirting boards 110 to each other and as a role of electrically connecting the respective wires 112 to each other.

By connecting the respective end portions of the adjacent skirting boards 110 to each other so as to form a right angle between them, using the connectors 113, multiple (four) skirting boards 110 are arranged so as to surround the indoor space H3. Then, the wires 112 respectively embedded in the adjacent skirting boards 110 via the connectors 113 are electrically connected to each other so as to have a coil form, and the power supply coil 111 is formed which forms a rectangle so as to surround the indoor space H3 when seen in a plan view.

When constructing the building B of the present embodiment, the wires 112 which form the power supply coil 111 are respectively provided in a series of the skirting boards 110 (building members) arranged so as to surround the indoor space H3, the skirting boards 110 are installed at the lower end edges of the respective wall panels 105, and the power supply coil 111 is formed which surrounds the indoor space H3 along the skirting boards 110 in the extending direction of the skirting boards 110. That is, the construction method for the building according to the present embodiment includes a step of linking multiple skirting boards 110 respectively provided with the wires 112 into which the power supply coil 111 forming a loop as a whole is split at multiple locations along the extending direction of the power supply coil 111, so as to surround the indoor space H3; and a step of forming the power supply coil 111 surrounding the indoor space H3 by electrically connecting the respective wires 112 to each other using the connectors 113.

In this manner, after constructing the building B by installing the multiple building units 107, a power supply cable connected to a power source (not illustrated) is connected to the power supply coil 111 (wires 112) provided in the skirting boards 110.

As illustrated in FIG. 7, a power receiving coil 119a has the same resonance frequency as that of the power supply coil 111. After being attached to the electrical appliances 119 (electrical loads) such as the household appliances, the power receiving coil 119a is electrically and directly connected to the electrical appliances 119, or connected to the electrical appliances 119 via the power supply cable to be appropriately arranged in the indoor space H3 of the building B. The term "the same resonance frequency" is not limited to meaning completely the same, but is meant to mean substantially the same.

In the building B having the above-described configuration, if the current having the same frequency as the resonance frequency flows from the power source to the power supply coil 111 provided in the skirting boards 110, the magnetic field vibrates between the power supply coil 111 and the power receiving coil, and a resonance phenomenon occurs between the power supply coil 111 and the power receiving coil. Then, if the resonance phenomenon is caused to occur in this way, the electrical power is supplied from the power supply coil 111 to the power receiving coil 119a, consequently to the electrical appliances 119 via the magnetic field generated between the power supply coil 111 and the power receiving coil 119a.

The building B of the present embodiment includes the power supply coil 111 of the contactless power supply system using magnetic field resonance, the contactless power supply system having the power supply distance longer than that of an electromagnetic induction system and being capable of supplying higher electrical power than the radio wave system, instead of the electromagnetic induction system in which it is difficult to increase the power supply distance while high electrical power can be supplied, or instead of the radio wave system in which it is difficult to increase suppliable electrical power while the power supply distance can be increased.

The power supply coil 111, being provided in a series of the skirting boards 110 (building members) arranged so as to surround the indoor space H3, is arranged so as to surround the indoor space H3. In this manner, it is possible to perform the contactless power supply to the electrical appliances 119 such as the household appliances at any position of the indoor space H3 of the building B. In addition, it is possible to achieve a cordless system by eliminating a need to install the connector such as the plug socket, and it is possible to enhance interior design. Furthermore, it is not necessary to form the opening for wiring on the building members 104, 105 and 106 of the wall, ceiling and floor, thereby enabling the workability and indoor designability to be improved. Accordingly, it is also possible to prevent deterioration due to the formation of the opening, in the airtightness of the building members or the building.

In addition, there is no longer restriction on the power supply position caused by the fixed installing location of the connector such as the plug socket. Therefore, the flexibility is enhanced in arranging the electrical loads such as the household appliances, and thus the design can be easily changed. Then, without the layout being restricted, when the building is designed, the layout is smoothly settled without any restriction from a viewpoint of the power supply. In particular, after completing the building B, it is possible to easily change the layout and design of the indoor space H3 later.

In addition, since the electric wiring when constructing or after completing the building B is substantially no longer required, the construction cost for the electric wiring work can be saved. In particular, it is possible to reduce the economic burden in a case of changing the layout later. Accordingly, the indoor can be arranged to follow the current indoor design trends, and thus it is possible to easily respond to a change in the design of the building B which evolves with the lapse of time.

Furthermore, in the building B of the present embodiment, since the skirting boards 110 are selected as the building member provided with the power supply coil 111, it is possible to reliably and easily form the power supply coil 111 so as to surround the indoor space H3. In addition, the wires 112 are respectively provided in the respective skirting boards 110 (building member) formed to be divided in the circumferential direction of a rectangular frame surrounding the indoor space H3, and the mutually adjacent skirting boards 110 are mechanically connected to each other using the connectors 113. This connection also enables the wires 112 of the mutually adjacent skirting boards 110 to be electrically connected to each other via the conductive members 114. As a result, it is possible to form the power supply coil 111 having a loop shape by connecting the respective wires 112 so as to surround the indoor space H3. Accordingly, it is possible to reliably and easily arrange the power supply coil 111 so as to surround the indoor space H3.

In addition, in the construction method for the building B of the present embodiment, by providing the power supply coil 111 in a series of the skirting boards 110 arranged so as to surround the indoor space H3, it is possible to form the power supply coil 111 surrounding the indoor space H3, and it is possible to obtain an advantageous operation effect of the building B having the above-described power supply coil 111.

Hitherto, the building B and the construction method thereof according to the second embodiment of the present invention have been described. However, the present invention is not limited to only the configuration of the above-described embodiment and can be appropriately modified without departing from the scope thereof. For example, in the present embodiment, a case where the building B is constructed by using the unit construction method has been described, but the building may be constructed using an alternative construction method such as a general wooden structure construction method in the conventional art. Even in this case, it is possible to obtain the same advantageous operation effect as that of the present embodiment by providing the building member with the power supply coil 111.

In addition, in the present embodiment, a case where the skirting boards 110 are adopted as the building member provided with the power supply coil 111 has been described. However, it is preferable that as the building members, a series of the building members are arranged so as to surround the indoor space H3. Without being limited to only the skirting boards 110, the building member can be applied to at least one of the wall material, flooring material and ceiling material. For example, as illustrated by the virtual line in FIG. 7, even if the wall panels 105 are adopted which include wires 112a horizontally laid at a vertically predetermined height position, it is possible to obtain the same advantageous operation effect as that of the present embodiment.

Figure 9:
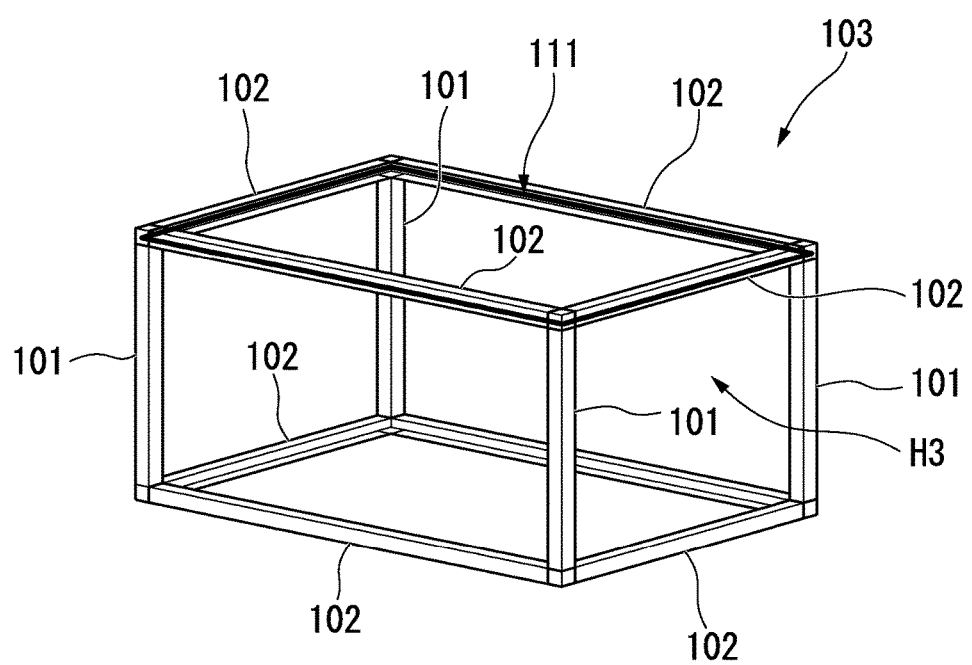
FIG. 9 is a view illustrating a modification example of the building unit, and is a perspective view illustrating a case where beam members are provided with a power supply coil.

Furthermore, for example, as illustrated in FIG. 9, the power supply coil 111 may be provided in steel beams 102 such as a series of the ceiling beams arranged so as to surround the indoor space H3 when seen in a plan view, and thus the power supply coil 111 may be formed (arranged) so as to surround the indoor space H3 along the steel beams 102 in the extending direction. Of course, even in this case, it is possible to obtain the same advantageous operation effect as that of the present embodiment.

In addition, for example, the wires 112 may be formed by being printed on the interior decorating cloth, and the cloth may be attached to the front surface or the rear surface of the building member located at the outermost surface (outermost surface side) forming the indoor space H3. Then, the respective wires 112 may be formed so as to surround the indoor space H3 and the power supply coil 111 may be arranged with this formation. In this manner, printing the wires 112 on the cloth enables the wires 112 to easily be provided in the building member. In addition, by attaching this cloth to the wall panels 105 or the ceiling panel 104 so as to surround the indoor space H3, it is possible to easily form the power supply coil 111 in the building B.

In addition, multiple power supply coils 111 surrounding the indoor space H3 may be arranged by appropriately combining the wall panels 105 and skirting boards 110 which have the wires 112, the beams and other building members which have the wires 112.

Third Embodiment

Hereinafter, a building according to a third embodiment of the present invention will be described with reference to FIGS. 10 to 13.

Similarly to the above-described first embodiment, the building of the present embodiment is a house, store, or office, and for example, is constructed using a unit construction method. Similarly to the building A described by using FIG. 1 in the above-described first embodiment, the building is formed by connecting multiple steel columns and multiple steel beams (building members) at a factory. For example, a ceiling panel, wall panels and a floor panel (building members) are installed in a frame structure body having a rigid-frame structure to construct a building unit having a rectangular parallelepiped shape. Then, multiple building units are transported to a construction job site, and are installed side by side on a base structure. Then, the building unit forming an upper stage is laid up on the building unit forming a lower stage. Furthermore, a building is constructed by integrating the multiple building units with each other.

Then, similarly to the building A of the above-described first embodiment, the building of the present embodiment includes a contactless power supply system for supplying the electrical power to electrical appliances such as household appliances (electrical loads) in a contactless manner. In addition, the contactless power supply system is a power supply system using magnetic field resonance, and includes a power supply coil (power supply side device and magnetic field generator) and a power receiving coil (power receiving side device). However, in the present embodiment, the size, number and arrangement of the power supply coil are different from those of the above-described first embodiment. Hereinafter, the differences will be mainly described.

Figure 10:
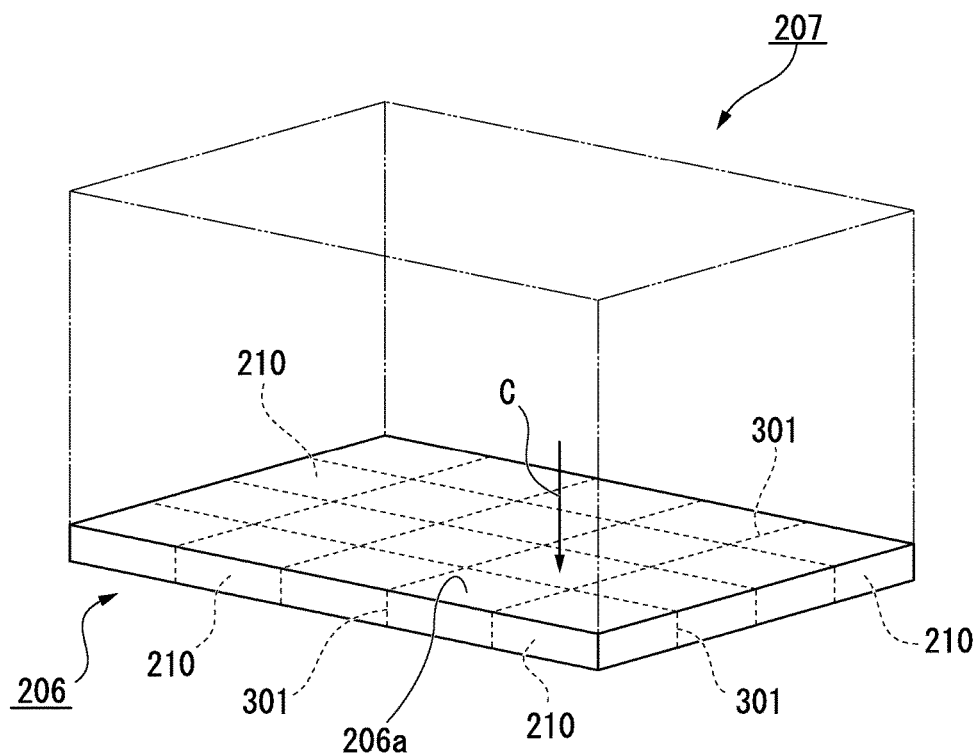
FIG. 10 is a perspective view illustrating a building unit of a building according to a third embodiment of the present invention.

FIG. 10 illustrates a building unit 207 of the present embodiment, which corresponds to the building unit 7 described in the first embodiment. In the first embodiment, a case has been described where a single large power supply coil 10 is provided so as to surround the substantially entire surface of the floor panel 6 of the building unit 7. However, in the present embodiment, as illustrated in FIGS. 10 and 11, multiple smaller power supply coils 210 (small coils) than the power supply coil 10 are provided inside a floor panel 206 so as to spread over the entire surface of the floor panel 206 when seen in a plan view.

Figure 12:
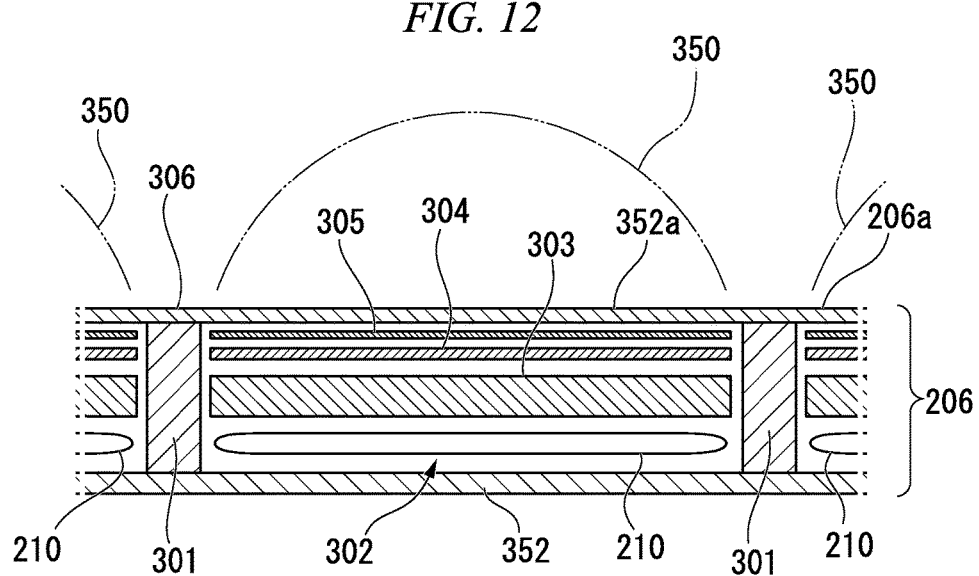
FIG. 12 is a view illustrating the arrangement of the power supply coil, and is a cross-sectional view taken along the line D-D in FIG. 11.

As illustrated in FIG. 12, the floor panel 206 of the present embodiment includes at least a bottom wall 352; multiple joists 301 that stand on the bottom wall 352; a flooring 306 supported on the joists 301; power supply coils 210, a heat insulating material 303, a particle board 304 and a sound insulation sheet 305, all of which are arranged inside a space 302 divided by the bottom wall 352, the joists 301 and the flooring 306.

Figure 11:
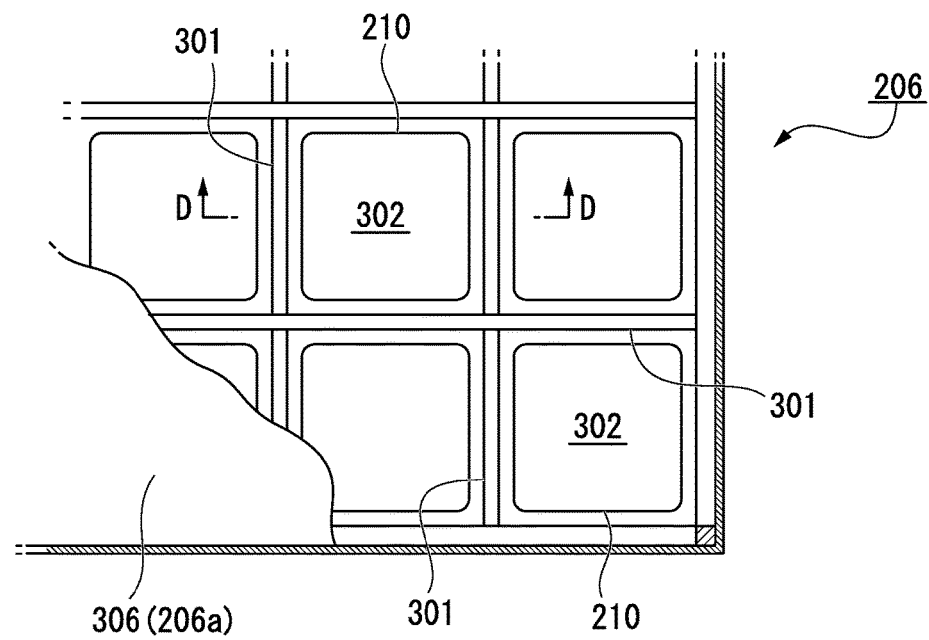
FIG. 11 is a view illustrating arrangement of a power supply coil in the building unit, and is a plane cross-sectional view seen from the arrow C in FIG. 10.

As illustrated in FIG. 11, although the flooring 306 is supported by the multiple joists 301 arranged in a lattice shape, the power supply coils 210 are individually arranged in the rectangular space 302 divided by these joists 301. The respective power supply coils 210 have a substantially rectangular shape (square or rectangular shape) surrounding the space 302 when seen in a plan view. In this manner, the power supply coil of the present embodiment includes the multiple small power supply coils 210, and furthermore these power supply coils 210 are arrayed vertically and horizontally so as to divide an indoor surface 206a which is the upper surface of the floor panel 206 into multiple regions. As a pitch between the respective joists 301, it is possible to adopt 45 cm, for example.

Then, when seen in a longitudinal cross-sectional view illustrated in FIG. 12, the respective power supply coils 210 are arranged so as to surround the space 302, between a pair of the joists 301 that stand on the bottom wall 352. Then, the heat insulating material 303 spreads over the inside of the space 302 so as to cover the power supply coils 210 from above, and further the particle board 304 and the sound insulation sheet 305 spread over thereon in this order. Then, finally, the flooring 306 is constructed on the upper surface of the joists 301. The respective members from the heat insulating material 303 to the flooring 306 do not contain metal. Accordingly, it does not interfere with the generation of a magnetic field 350 for which a power receiving coil receives the electrical power in the indoor space. For the same reason, during the construction, it is necessary not to provide a metal insulating film such as an aluminum sheet which adversely affects the formation of the magnetic field 350 above the power supply coils 210.

Figure 13:
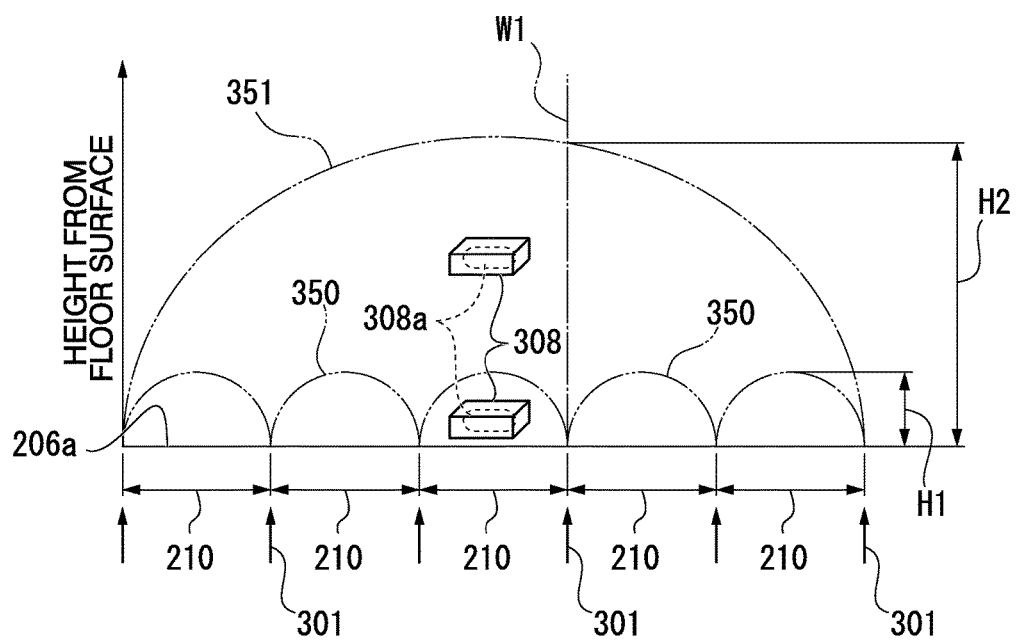
FIG. 13 is an explanatory view for illustrating a difference in magnetic field shapes between the above-described second embodiment and the above-described third embodiment.

FIG. 13 illustrates the distribution of the magnetic field 350 formed by the respective power supply coils 210 of the present embodiment, and a magnetic field 351 formed by the power supply coil 10 described in the first embodiment, in a direction along the surface of the floor panel 206. In FIG. 13, the horizontal axis indicates the arrangement of the power supply coils 10 or 210 from one end of the floor panel 206 to the other end, and the vertical axis indicates the height from the floor surface on which the magnetic field exerts influence.

The power supply coils 210 of the present embodiment are arranged between the respective joists 301, and generate the magnetic field 350 respectively having the intensity distribution with a substantially semi-circular shape. The size of the respective power supply coils 210 is smaller than the size of the power supply coil 10 of the first embodiment. Accordingly, the range on which the magnetic field exerts influence (that is, width dimension in the horizontal direction and the height in the vertical direction) is also relatively decreased. As a result, the multiple magnetic fields 350 having the lower height on which the magnetic field exerts influence than that of the power supply coil 10 of the above-described first embodiment are formed to cover the upper surface of the floor panel 206. Accordingly, compared to the magnetic field 351 with a height H2, which is formed by the power supply coil 10, it is possible to hold the magnetic field strength substantially flat and to lower the strength to a desired height H1 (for example, approximately 1.5 m). Therefore, it is particularly suitable in a case where the height on which the magnetic field exerts influence is required to be lowered or in a case of receiving the electrical power using a power receiving coil 308a of electrical appliances 308 (electrical loads) arranged at a position close to the floor panel 206.

On the other hand, in a case of the power supply coil 10, the height H2 on which the magnetic field 351 exerts influence is increased depending on the size. Accordingly, it is suitable in a case of receiving the electrical power using the power receiving coil 308a of the electrical appliances 308 (electrical loads) arranged at a relatively separated higher position than the floor panel 206.

The present embodiment adopts a configuration where the floor surface of the floor panel 206 is divided in a lattice shape, and the power supply coils 210 are respectively arranged inside each of the divided sections. Accordingly, it is possible to flexibly respond to the reconstruction work for changing the indoor design of the building unit 207. That is, referring back to FIG. 13, even if it becomes necessary to newly provide a partition wall, for example, at a position of W1 in FIG. 13 in order to change the indoor design, it is possible to distribute the magnetic field having the same height as that before the reconstruction work, in the indoor space, by using three power supply coils 210 from the left in FIG. 13. In addition, in a case where it is not necessary to supply the electrical power to the indoor space in the further right side in FIG. 13 than the partition wall W1, it is possible to very easily respond to the case by simply cutting off the current supply to two power supply coils 210 located at the further right side in FIG. 13 than the partition wall W1.

In addition, in a case where the indoor distribution of the magnetic field strength (range on which the magnetic field exerts influence) obtainable in the indoor space is required to have a desired distribution, since the present embodiment adopts a configuration where the power supply coils 210 are respectively arranged inside each region (each divided section), the size thereof may be varied for each arrangement region. For example, in a case where the magnetic field strength (range on which the magnetic field exerts influence) is required to be higher, a larger power supply coil 210 is installed. In contrast, in a case where the magnetic field strength is required to be lower, a smaller power supply coil 210 is installed. Here, the terms "large" and "small" mean the large and small sizes of the area surrounded by a loop formed by the power supply coil 210.

In addition, in the present embodiment, it is possible to carry out the work by using the space 302 formed between the respective joists 301 and arranging the power supply coils 210 in the space 302. Thus, from this viewpoint, the present embodiment is suitable for the reconstruction work for the building unit 207. That is, even in the conventional building unit 207 which does not include the power supply coils 210, it is no longer necessary to provide the power supply coils 210 across the joists 301. Since the processing work for the joist 301 themselves is not required, it is possible to easily install the power supply coils 210 later.

In a case of carrying out the reconstruction work of newly installing the power supply coils 210 with respect to the conventional building unit 207 which does not include the contactless power supply system, the convenience is further required, and the power supply coils 210 may be embedded into the heat insulating material 303 to be integrated therewith. In this case, the heat insulating material 303 having the embedded power supply coils 210 is manufactured at the factory in advance, and these are transported to the reconstruction work site. Then, after the floor panel 206 of the building unit 207 is peeled off, the old heat insulating material is removed and alternatively, a new heat insulating material 303 is installed. During this time, the processing work for the joists 301 is not required, and it is possible to spread the power supply coils 210 over the space 302 by simply replacing the heat insulating material.

Furthermore, in a case of carrying out the reconstruction work for changing the indoor design, after removing the old heat insulating material 303, the new heat insulating material 303 is alternatively installed. However, the heat insulating material 303 may be varied for each installation place such that the indoor distribution of the magnetic field strength (range on which the magnetic field exerts influence) obtainable in the indoor space after the reconstruction work becomes a desired distribution. For example, in a place of requiring the higher magnetic field strength (range on which the magnetic field exerts influence), the heat insulating material 303 having the larger embedded power supply coil 210 may be arranged. In contrast, in a place of requiring the lower magnetic field strength (range on which the magnetic field exerts influence) or in a case of setting the strength to zero, the heat insulating material 303 having the smaller embedded power supply coil 210 or the heat insulating material 303 which does not include the power supply coil 210 may be arranged.

In addition, in a case of newly constructing the building unit 207, the power supply coils 210 may be provided integrally with the joists 301 themselves in advance. In this case, it is possible to simultaneously install many power supply coils 210 by simply installing the joists 301.

In a case of integrally providing the power supply coils 210, as described above, the coils may be provided integrally with either the heat insulating material 303 or the joist 301. Alternatively, the coils may be provided integrally with both of them if necessary.

In addition, although not illustrated, the respective power supply coils 210 of the present embodiment, are connected in parallel to the power source via a control circuit, and can individually control a value of the current flowing in the respective power supply coils 210. This control enables the value of the current to be minutely adjusted for each of the power supply coils 210. Thus, it becomes possible to minutely adjust the magnetic field strength to be generated, for each of the power supply coils 210. As a result, it becomes possible to apply the strength or weakness to the magnetic field strength distribution along the floor surface for example, in such a manner as to form a region partially having the higher magnetic field strength, or conversely to form a region having the lower magnetic field strength, when the floor panel 206 is seen in a plan view.

In addition, in the present embodiment, in a case where the respective power supply coils 210 are connected in series, and are then connected to the power source (not illustrated), it is possible to electrically connect the mutually adjacent power supply coils 210 to each other by carrying out wiring work so as to cross over the upper surface of the respective joists 301. Alternatively, a repeater (not illustrated, relay) may be provided between the respective power supply coils 210 such that the coils are connected to each other in a wireless manner via the repeater. In this case, multiple repeaters are required, but since the manufacturing cost for the repeaters themselves is inexpensive, no significant influence is exerted on the construction cost. Preferably, an advantage of highly flexible construction work can be obtained by the wireless connection.

Hitherto, the respective embodiments of the present invention have been described. However, the present invention is not limited to only the configurations and methods of the embodiments, but can be modified without departing from the scope of the present invention. In addition, the modification which appropriately combines the configurations and methods of the respective embodiments is also intended to be included within the scope of the present invention.

According to the present invention, it is possible to supply an electrical power to a electrical load without any restriction due to an indoor layout. It is possible to provide a building including a power supply coil of a contactless power supply system, and a construction method for the building.

DESCRIPTION OF THE REFERENCE SYMBOLS

4 ceiling panel (ceiling material)
5 wall material (wall panel)
6, 206 flooring material (floor panel)
8 other building member located on outermost layer (base)
9 building member (decorative laminate) located on innermost layer
10, 111 power supply coil
110 multiple building members and skirting boards which are continuously provided
112 wire (split wire)
113 connector
206a indoor surface
210 power supply coil and small coil
A, B building
H1, H3 indoor space

The invention claimed is:

1. A building comprising:
a plurality of building units, each building unit comprising:
a single first power supply coil of a contactless power supply system using magnetic field resonance, and
a plurality of building members continuously formed so as to surround an indoor space,
wherein
the first power supply coil includes loops,
each of the loops is formed of split wires provided in the plurality of building members and surrounds the indoor space in a horizontal direction along an arrangement direction of the plurality of building members,
the split wires are electrically connected by connectors, and
a second power supply coil and a power receiving coil for supplying electric power to the first power supply coil are provided between the plurality of building units so as to be positioned opposite to each other.

2. The building according to claim 1,
wherein the power supply coil is arranged between a building member located on an innermost layer facing an indoor space and another building member located on an outermost layer facing the outdoor.

3. The building according to claim 1, further comprising:
a repeater that is configured to resonate at a same frequency as that of the power supply coil.

4. The building according to claim 1,
wherein the building member is at least one of a wall material, skirting board, flooring material and ceiling material.

5. A building comprising:
a plurality of building units, each building unit comprising:
a first power supply coil of a contactless power supply system using magnetic field resonance, and
a plurality of building members having an indoor surface facing an indoor space continuously and provided so as to surround the indoor space,
wherein
the first power supply coil includes a plurality of small coils, and the small coils are arrayed so as to divide the indoor surface into a plurality of regions,
the small coils are electrically connected in parallel to a power source such that a value of a current flowing in each of the small coils is controllable, and
a second power supply coil and a power receiving coil for supplying electric power to the first power supply coil are provided between the plurality of building units so as to be positioned opposite to each other.

6. The building according to claim 5,
wherein the building member is a flooring material including joists arranged in a lattice pattern and a heat insulating material arranged between the joists, and
wherein the small coils are integrally provided in at least any one of the heat insulating material and the joists.

7. The building according to claim 6,
wherein the size of the small coils varies for each of the regions.

8. The building according to claim 5,
wherein the size of the small coils varies for each of the regions.

9. A construction method for a building including a plurality of building units, the method comprising:
linking a plurality of building members to each other so as to surround an indoor space, the building members being provided with split wires; and
forming a first power supply coil by using a plurality of connectors to electrically connect the respective split wires to each other and forming the plurality of building units each comprising the indoor space surrounded by the first power supply coil, and
providing a second power supply coil and a power receiving coil between the plurality of building units so as to be positioned opposite to each other, the second power supply coil and the power receiving coil being for supplying electric power to the first power supply coil, wherein
the first power supply coil includes loops, and
each of the loops is formed of split wires and surrounds the indoor space in a horizontal direction along an arrangement direction of the plurality of building members.

* * * * *